United States Patent [19]

Yamada et al.

[11] 4,291,293
[45] Sep. 22, 1981

[54] SEMICONDUCTOR ABSOLUTE PRESSURE TRANSDUCER ASSEMBLY AND METHOD

[75] Inventors: Kazuji Yamada; Seiko Suzuki; Motohisa Nishihara; Kanji Kawakami; Hideo Sato; Shigeyuki Kobori; Ryosaku Kanzawa; Minoru Takahashi; Hitoshi Minorikawa, all of Ibaraki, Japan

[73] Assignee: Hitachi, Ltd., Tokyo, Japan

[21] Appl. No.: 76,813

[22] Filed: Sep. 19, 1979

[30] Foreign Application Priority Data

Sep. 27, 1978 [JP] Japan ................. 53/119016

[51] Int. Cl.³ .................................. G01L 1/22
[52] U.S. Cl. .......................... 338/4; 73/727; 357/26
[58] Field of Search ..................... 338/2–5, 338/42; 73/720, 721, 726, 727; 357/26; 29/610 SG

[56] References Cited

U.S. PATENT DOCUMENTS

| | | | |
|---|---|---|---|
| 3,397,278 | 10/1966 | Pomerantz | 174/52 |
| 3,595,719 | 7/1971 | Pomerantz | 156/17 |
| 3,918,019 | 11/1975 | Nunn | 338/42 |
| 3,968,466 | 7/1976 | Nakamura et al. | 338/42 |
| 4,023,562 | 5/1977 | Hynecek et al. | 73/727 X |
| 4,079,508 | 3/1978 | Nunn | 338/2 X |

Primary Examiner—C. L. Albritton
Attorney, Agent, or Firm—Craig & Antonelli

[57] ABSTRACT

A semiconductor pressure transducer assembly comprising a silicon diaphragm assembly and a glass covering member. The silicon diaphragm assembly has a circular diaphragm portion of thin silicon which is formed using etching, and a thick supporting portion therearound. Piezoresistive elements of a piezoresistive bridge circuit and conducting paths for electrically connection thereof are formed on the silicon diaphragm assembly. On a surface of the silicon diaphragm assembly, a passivating layer of silicon dioxide are formed in uniform thickness, and further on a surface of the passivating layer is formed a layer of polysilicon on the supporting portion of the silicon diaphragm assembly. In the passivating layer, a contacting window is formed, through which the polysilicon layer is electrically connected to the silicon diaphragm assembly. The covering member of borosilicate glass having a circular well is mounted and bonded onto the silicon diaphragm assembly in contact with the polysilicon layer using Anodic Bonding method. And the processed silicon diaphragm assembly has a flat surface thereof, on which the piezoresistive elements and the conducting paths are constructed using Ion Implantation method, or reforming a silicon dioxide layer thereon after removing another silicon dioxide layer used as mask in diffusing process.

10 Claims, 13 Drawing Figures

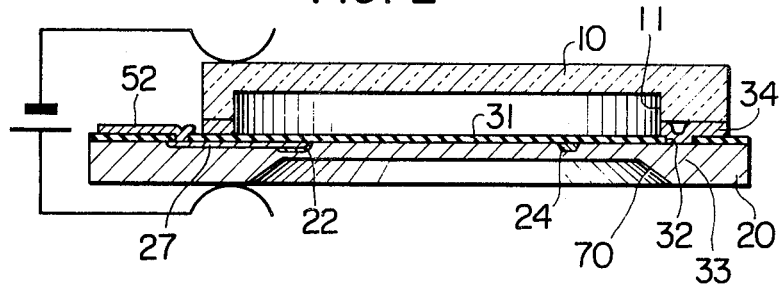
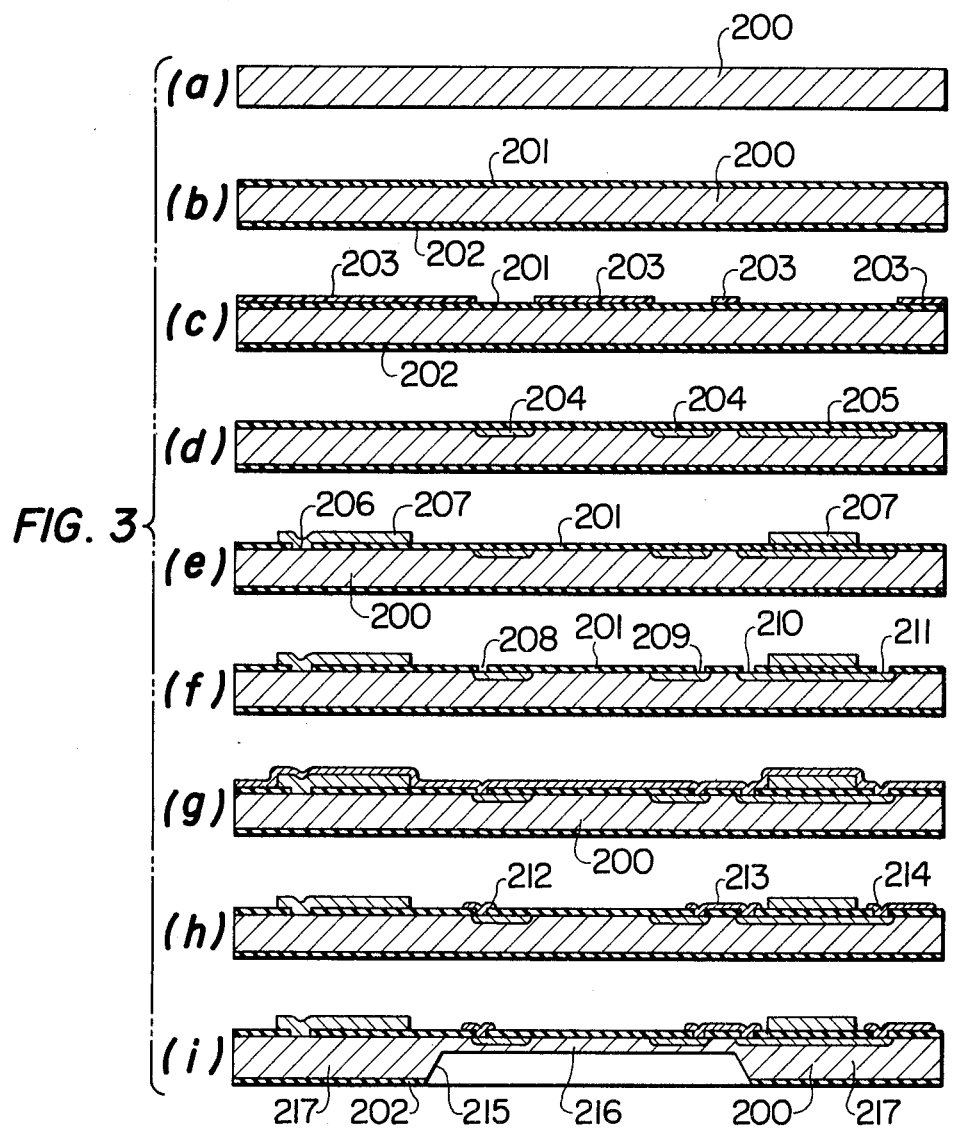

SEMICONDUCTOR ABSOLUTE PRESSURE TRANSDUCER ASSEMBLY AND METHOD

BACKGROUND OF THE INVENTION

The present invention relates to a semiconductor absolute pressure transducer assembly having a covering member mounted on a silicon diaphragm assembly on which semiconductor pressure sensitive elements are constructed, therefore, a vacuum chamber being provided therebetween. More particularly, the present invention relates to a semiconductor absolute pressure transducer assembly which is fabricated using a method for obtaining ideally hermitic seal between the silicon diaphragm assembly and the covering member.

In an ordinal semiconductor absolute pressure transducer assembly, semiconductor pressure sensitive elements such as piezoresistive bridge circuit are constructed on a silicon diaphragm assembly, each element of which varies its resistance value depending on pressure-induced strains, and a glass substrate is mounted on the surface of the silicon diaphragm assembly, thereby a vacuum chamber being formed therebetween. In electric signal, therefore relative to pressure applied to the silicon diaphragm, is obtained as an output. In manufacturing such pressure transducer assembly, it is considerably important to obtain perfectly hermetic seal between the silicon diaphragm assembly and the glass covering member, and simultaneously to fabricate a silicon diaphragm in which the pressure-induced strains appear uniformly on the whole surface in response to the pressure applied thereto.

In U.S. Pat. Nos. 3,918,019 or 4,079,508, there is shown a semiconductor pressure transducer assembly having a glass substrate and a thin silicon diaphragm upon which is diffused a piezoresistive bridge circuit. Bridge circuit components are properly oriented on the surface of the silicon diaphragm and connected to bonding pads and conducting paths, both of which are formed on the silicon diaphragm. The glass substrate has a circular well formed therein having a diameter at least as large as the diameter of the diaphragm. Conducting leads are disposed on the glass substrate in a pattern matching that of the bonding pads on the silicon. The silicon is bonded onto the glass substrate with the silicon diaphragm overlaying the well in the glass and bonding pads overlaying the conducting leads deposited on the glass using Anodic Bonding method. The bond performed by that method provides a hermietic seal between the silicon diaphragm and the glass substrate.

Generally, layer of insulating material such as silicon dioxide (SiO$_2$) is provided on the surface of the silicon diaphragm for the purpose of protecting the piezoresistive bridge circuit and the conducting paths formed thereon. In such construction, however, it is very difficult to bond the insulating material such as glass substrate on the surface of the silicon diaphragm assembly under perfectly hermetic condition using a method such as Anodic Bonding.

In U.S. Pat. No. 3,595,719, method for bonding an insulator member to a passivating layer covering a surface of a semiconductor is described. In this method, etching of passivating layer is performed to a thickness of at least about 1,000 A. with an etchant prior to bonding.

In the case that such method is adapted for manufacturing of the transducer assembly mentioned above, the characteristic of the piezoresistive bridge circuit is harmfully affected because of high voltage applied across the p-n junction thereof. Namely, the silicon diaphragm assembly is n-type and pressure sensitive resistors of the piezoresistive bridge circuit which are diffused thereon are p-type. When the high voltage is applied between the silicon diaphragm and the glass substrate, with the positive voltage to the silicon diaphragm and the negative one to the glass substrate, then leak current flows through the p-n junction, thereby the insulating characteristic of the p-n junction of the piezoresistive bridge circuit becoming inferior.

Further, the conducting paths are formed by p+diffusion which yields a low resistivity of the n-type silicon. However, this diffusion also causes grooves along the constructed conducting paths, though they are very shallow in the depth. And the grooves have influence upon the hermetic seal between the silicon diaphragm and the glass substrate.

Another prior art is as follows:
(1) U.S. Pat. No. 3,397,278, "ANODIC BONDING":
This relates to Anodic Bonding technique.
(2) U.S. Pat. No. 3,968,466, "PRESSURE TRANSDUCER":
This shows the construction of a conventional pressure transducer.

SUMMARY OF THE INVENTION

An object of the present invention, accordingly, is to provide a semiconductor absolute pressure transducer assembly in which an insulator covering member is hermetically bonded on a silicon diaphragm assembly on which piezoresistive bridge circuit and conducting paths are constructed, and therefore, an absolute pressure signal relative to pressure applied to the silicon diaphragm is provided with accuracy.

Another object of the present invention is to provide a semiconductor absolute pressure transducer assembly and method, in which is provided a silicon diaphragm assembly on which uniform pressure-induced strains appear, therefore, a pressure signal being produced in accuracy.

Further, another object of the present invention is to provide a semiconductor absolute pressure transducer assembly being suitable for mass production.

The object mentioned above, in accordance with the present invention, is achieved by a semiconductor absolute pressure transducer assembly having a silicon diaphragm assembly, on the surface of which are laminated a passivating layer of insulating material and a layer of conductive material, and a covering member of insulating material which is hermetically bonded on the silicon diaphragm assembly using a method of Anodic Bonding, wherein the flatten surface of the silicon diaphragm, on which are constructed piezoresistive elements and conducting paths, is achieved by using a method of Ion Inplantation or by newly depositing a passivating layer on the surface of the silicon diaphragm assembly after removing a silicon dioxide layer which is used in diffusion process.

The object mentioned above, in accordance with the present invention, is achieved by a semiconductor absolute pressure transducer assembly having a silicon diaphragm assembly, on the surface of which are laminated a passivating layer of insulating material and a layer of conductive material, and a covering member of insulating material which is hermetically bonded on the silicon diaphragm assembly using a method of Anodic Bonding, wherein the layer of conductive material is formed on the area of the surface of the passivating layer corresponding to the supporting portion of the silicon diaphragm assembly.

The object mentioned above, in accordance with the present invention, is achieved by a semiconductor absolute pressure transducer assembly having a silicon diaphragm assembly, on the surface of which are laminated a passivating layer of insulating material and a layer of conductive material, a covering member of insulating material which is hermetically bonded on the silicon using a method of Anodic Bonding, and piezoresistive elements and conducting paths are constructed on the silicon diaphragm assembly, wherein a window portion is provided on the passivating layer, and via the window portion thereof electrically connecting between the silicon diaphragm assembly and the conductive layer which is deposited on the passivating layer of insulating material.

These objects mentioned above and other objects and advantages of the present invention will become apparent from the following detailed description of preferred embodiment given by reference to the accompanying drawings.

BRIEF DESCRIPTION OF DRAWINGS

FIG. 2 is a sectional view of the semiconductor absolute pressure transducer assembly shown in FIGS. 1(a) and 1(b) along the two dotted chain line 2—2; and FIGS. 3(a) to 3(i) show one method for fabricating a silicon diaphragm assembly on which piezoresistive elements and conducting paths are constructed using method of Ion Implantation.

DETAILED DESCRIPTION OF PREFERRED EMBODIMENT

Figure 1A:
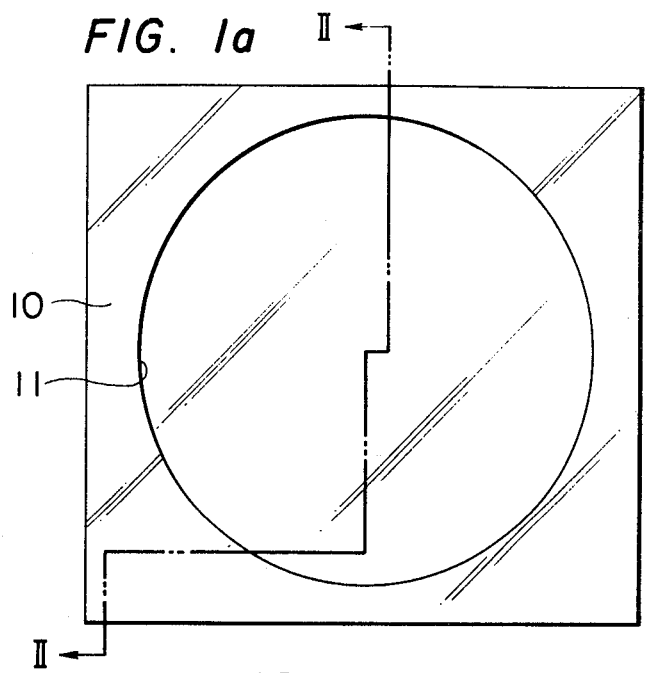
FIGS. 1a and 1b are a bottom plane view of a glass covering member and a top plane view of a silicon diaphragm assembly of an embodiment of a semiconductor absolute pressure transducer assembly constructed in accordance with the present invention.
Figure 1B:
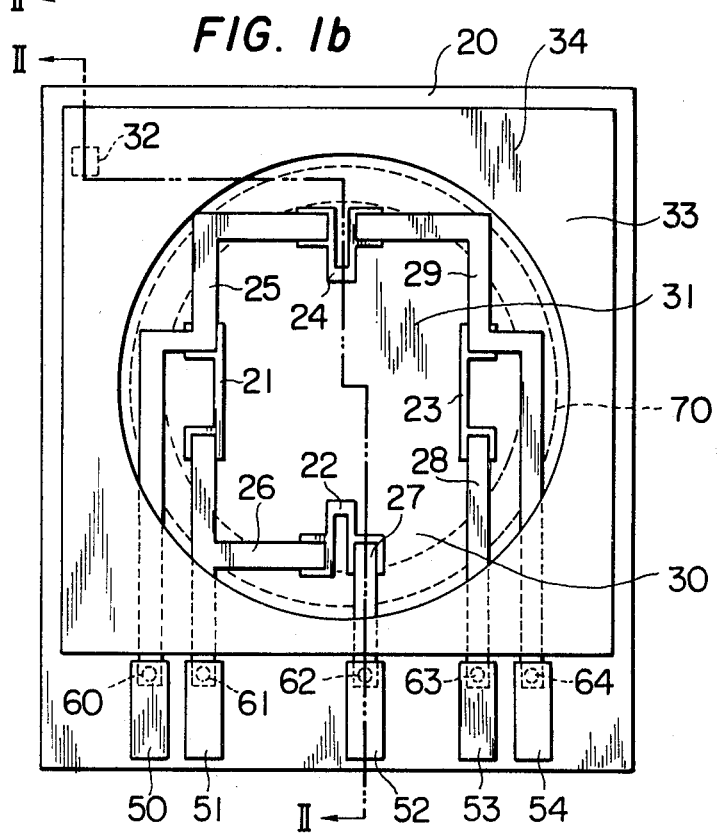

Referring now to FIGS. 1(a), 1(b) and 2, a semiconductor absolute pressure transducer assembly having a covering member 10 of insulating material in which a circular well 11 is formed on the bottom surface thereof. The covering member 10 is composed of insulating material which has a thermal expansion coefficient substantially equal to that of silicon, for the purpose of elimination of thermal distortion due to the difference between the thermal expansion coefficients thereof. In this embodiment, such material as mentioned above is borosilicate glass which is available from Corning Glass work under the trademark "Pyrex," more preferably "Pyrex No. 7740." This borosilicate glass also shows good stickability to silicon, when it is bonded using Anodic Bonding.

On an upper surface of a silicon diaphragm assembly 20 of single silicon crystal, four strain gauge elements 21, 22, 23 and 24 are properly oriented with respected to the crystal axises thereof, and conducting paths 25, 26, 27, 28 and 29 are constructed, using Ion Inplanation or diffusion. These strain gauge elements 21, 22, 23 and 24 which construct a piezoresistive bridge circuit are positioned on a thin silicon diaphragm portion 30 of the silicon diaphragm assembly 20, which is designated by broke line in the top plane view of FIG. 1(b), and these conducting paths 25, 26, 27, 28 and 29 are also provided thereon for electrical connection of these strain gauge elements 21, 22, 23 and 24. A passivating layer 31 of insulating material, such as silicon dioxide ($SiO_2$) is formed on the whole surface of the processed silicon diaphragm assembly 20. This is clearly shown in the sectional view of FIG. 2. A square contacting window 32 is provided on the passivating layer in the area corresponding to a thick supporting portion 33 of the silicon diaphragm assembly 20. Further on a surface of the passivating layer 31 laminated on the silicon diaphragm assembly 20, a layer 34 of conductive material such as polysilicon is also formed on the thick supporting portion 33, more particularly on the area corresponding to contacting surface between the silicon diaphragm assembly 20 and the glass covering member 10. Through the square contacting window 32, the silicon diaphragm assembly 20 electrically connects to the polysilicon layer 34, both of which are electrically insulated to each other with the laminated insulator passivating layer 31 mentioned above.

At the end portions of the conducting paths 25, 26, 27, 28 and 29, five metal electrodes 50, 51, 52, 53 and 54 are constructed, respectively. In the same manner as mentioned above, circular contacting windows 60, 61, 62, 63 and 64 are first provided on the surface of the insulator passivating layer, and then, metal such as aluminum (Al) is selectively evaporated thereon. Therefore, these metal electrodes 50, 51, 52, 53 and 54 electrically connect through these windows 60, 61, 62, 63 and 64 and these conducting paths 25, 26, 27, 28 and 29 to the strain gauge elements 21, 22, 23 and 24 of the piezoresistive bridge circuit.

On the bottom surface of the silicon diaphragm assembly 20, a circular groove 70 is formed at an uniform depth using etching. Thereby, the thin diaphragm portion 30, which is defined by the surrounding thick supporting portion 33, is formed in the silicon diaphragm assembly 20.

The diameter of the circular well 11 formed in the glass covering member 10 is designed at equal to or greater than that of circular diaphragm portion 30 of the silicon diaphragm assembly 20. Thereby, a vacuum chamber is defined by the circular well 11 and the diaphragm portion 30, when the glass covering member 10 is mounted and bonded on the silicon diaphragm assembly 20.

The bonding between the glass covering member 10 and the silicon diaphragm assembly 20 is performed using Anodic Bonding. This bonding method is for bonding semiconductor or conductor such as silicon to insulator such as borosilicate glass without necessity of bonding pads, and the details thereof are described, for example, in U.S. Pat. No. 3,397,278. In this embodiment, as shown in FIG. 2, the processed silicon diaphragm assembly 20 and the glass covering member 10 are piled up, and a positive pole and a negative pole are provided, with the former to the silicon diaphragm assembly 20 and the latter to the glass covering member 10. Then, the piled silicon diaphragm assembly 20 and the glass covering member 10 are placed in vacuum condition and heated about to 300° C. Between these poles, voltage of about 700 volt is applied for about 10 minutes. Because the silicon diaphragm assembly 20 is electrically connected through the contacting window 32 to the polysilicon layer 34, the high voltage is applied between the glass covering member 10 and the silicon diaphragm assembly 20. Thereby, the glass covering member 10 is firmly bonded onto the surface of the polysilicon layer 34 of the silicon diaphragm assembly 20. The semiconductor absolute pressure transducer assembly having such construction as mentioned above, because it is enough to contact the positive pole of the high voltage not to the polysilicon layer 34 but to the body of the silicon diaphragm assembly 20, has no difficulty in the bonding process, therefore, being suitable for mass production.

The conductive layer 34 of polysilicon, in this embodiment, as previously explained, is provided only on the area corresponding to a thick supporting portion 33 of the silicon diaphragm assembly 20. In other words, the polysilicon layer 34 is not provided on the surface of the diaphragm portion 30 of the silicon diaphragm assembly 20. Generally speaking, the surface of the polysilicon layer formed using spattering, vapor growth or evaportion is not so smooth. In the case that such polysilicon layer 34 is laminated on the surface of the diaphragm portion 30, there is possibility that the polysilicon layer 34 can be easily cracked by the straining force caused due to application of pressure. This cracking has various inferior influences upon the characteristics of the diaphragm portion 30 of the silicon diaphragm assembly 20, for example decreasing the intensity of the diaphragm and so on. Further, if there is inuniformity in the thickness of the polysilicon layer 34 formed on the diaphragm portion 30, the characteristics of the silicon diaphragm assembly 20 is inferiorly affected because of variety of strains appearing in the diaphragm portion 30 thereof.

Referring now to FIGS. 3(a) to 3(i), there is shown a process for fabricating a silicon diaphragm assembly using Ion Inplanation. First of all, referring to FIG. 3(a), a starting material is a silicon substrate 200 of n-type. In FIG. 3(b), on the both surfaces of the silicon substrate 200 are formed silicon dioxide (SiO₂) layers 201 and 202, and in FIG. 3(c), a photoresist layer 203 is selectively etched using photoetching, after being coated on the surface of the silicon dioxide layer 201 on the silicon substrate 200. In FIG. 3(d), piezoresistors 204 of a piezoresistive bridge circuit and diffused layers 205 of conducting paths are constructed on the silicon substrate 200 using the Ion Inplanation. In this method, the remineded photoresist layer 203 is used as maks for ior inplanation, and the piezoresistors 204 of p-type and the diffused alyer 205 of p+-type are constructed thereby. The photoresist layer 203 is removed afterward. In FIG. 3(e), part of the silicon dioxide layer 201 is etched and a contacting window 206 is provided thereby. A layer of polysilicon is first coated on the whole surface of the silicon dioxide passivating dioxide layer 201 with the contacting window 206, and then is removed by etching, remaining a portion 207 on which is later mounted a glass covering member. Apparently shown in the figure, the polysilicon layer 207, which is reminded on the silicon dioxide layer 201, electrically connects to the silicon substrate 200. In FIG. 3(f), further contacting windows 208, 209, 210 and 211 are etched on the surface of the silicon dioxde layer 201. Electrode material such as aluminum (Al) is coated on the whole surface of the silicon substrate 200, and a afterward is selectively removed by etching, thereby, electrodes 212, 213 and 214 being formed thereon, as shown in FIGS. 3(g) and 3(h). And in FIG. 3(i), a circular groove 215 is formed using alkaline etching in which the silicon dioxide layer 202 of the bottom side of the silicon substrate 200 is used as mask member, and a thin silicon disphragm portion 216 is definded by a thick silicon supporting portion 217 surrounding thereof. Then, the reminded silicon dioxide layer 202 is removed, and a silicon diaphragm assembly is fabricated.

Figure 4:
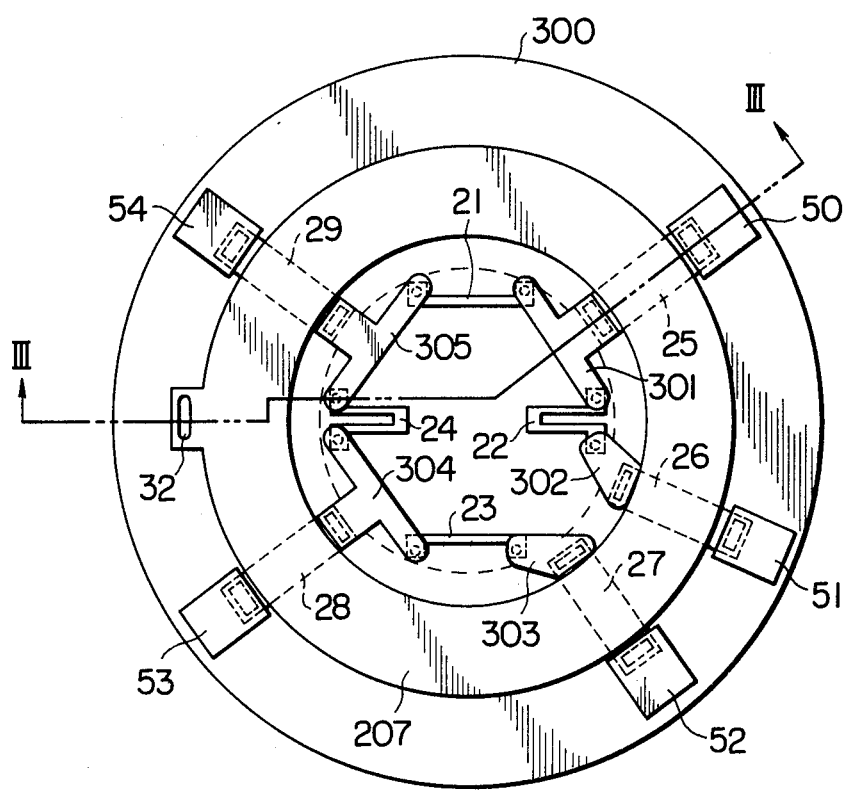
FIG. 4 is a top plane view of the silicon diaphragm which is fabricated according to the method shown in FIGS. 3(a) to 3(i).

A top plane view of the silicon diaphragm assembly 300 is shown in FIG. 4, in which reference numerals 301, 302, 303, 304 and 305 designate five metal layers of aluminum (Al). Through these aluminum layers 301, 302, 303, 304 and 305, the strain gauge elements 21, 22, 23 and 24 are electrically connected to the conducting paths 25, 26, 27, 28 and 29, respectively. And reference numeral 32 designates the contacting window through which the polysilicon layer 207 is electrically connected to the silicon substrate, and reference numerals 50, 51, 52, 53 and 54 designate the five electrodes which are respectively connected to the conducting paths 25, 26, 27, 28 and 29.

The diffusion layers, such as conducting paths of p+-type, which are constructed using the above mentioned Ion Inplanation, has no grooves because the Ion Implantation can be performed from upward of the silicon dioxide layer coated on the silicon substrate. This is clearly shown in FIG. 3(d). The silicon diaphragm assembly, therefore, has the diaphragm portion of uniform thickness, and has very flat and smooth surface thereof. Because of this flatness of the surface, the polysilicon layer can be formed in uniform thickness on the silicon diaphragm assembly. Therefore, the stickability of the glass covering member onto the polysilicon layer is good, and ideal hermetic seals therebetween can be obtained by using the Anodic Bonding.

Another method for fabricating such silicon diaphragm assembly as mentioned above will be explained herein-after. Namely, after the process for diffusion of impurity such as well-known thermal diffusion, the silicon dioxide layer masked on the silicon substrate is removed by etching. Newly, a layer of silicon dioxide is re-formed on the whole surface of the processed silicon at certain constant thickness. And further thereon, the polysilicon layer is selectively formed on the area corresponding to contacting surface between the silicon diaphragm assembly and the glass covering member.

While we have shown and described embodiments in accordance with the present invention, it is understood that the same is not limitted thereto but is susceptible for numerous changes and modifications as are obvious of those of ordinary skill in the art, and we therefore do not wish to be limitted to the details described and shown herein but intended to cover all such changes and modifications as are obvious to those of skill in the art.

What is claimed is:

1. A semiconductor pressure transducer assembly comprising: a silicon diaphragam assembly having a thin pressure sensitive diaphragm portion and a thick supporting portion surrounding the pressure sensitive diaphragm portion; piezoresistive elements constructed on the pressure sensitive diaphragm portion of said silicon diaphragm assembly, the resistance values of the piezoresistive elements varying depending on the strain appearing in the diaphragm portion in response to pressure applied thereto; conducting paths constructed on said silicon diaphragm assembly for electrically connecting of said piezoresistive elements; a passivating layer of insulating material covering a surface of said silicon diaphragm assembly on which said piezoresistive elements and said conducting paths are constructed; a layer of conductive material formed on a surface of said passivating layer; and a covering member of insulating material mounted and bonded onto said silicon diaphragm assembly in contact with said conductive material layer on said passivating layer using Anodic Bonding method, wherein said piezoresistive elements and said conducting paths are constructed on said silicon diaphragm assembly using Ion Implantation method.

2. A semiconductor pressure transducer assembly as claimed in claim 1, wherein a photoresist formed on the surface of said silicon diaphragm assembly is used as mask means in the Ion Implantation method.

3. A semiconductor pressure transducer assembly comprising:

a silicon diaphragm assembly having a thin pressure sensitive diaphragm portion and a thick supporting portion surrounding the pressure sensitive diaphragm portion; piezoresistive elements constructed on the pressure sensitive portion of said silicon diaphragm assembly, the resistance values of the piezoresistive elements varying depending on the strain appearing in the diaphragm portion in response to pressure applied thereto; conducting paths constructed on said silicon diaphragm assembly for electrically connecting of said piezoresistive elements; a passivating layer of insulating material covering a surface of said silicon diaphragm assembly on which said piezoresistive elements and said conducting paths are constructed; a layer of conductive material formed on a surface of said passivating layer; and a covering member of insulating material mounted and bonded onto said silicon diaphragm assembly on contact with said conductive material layer on said passivating layer using Anodic Bonding method, wherein said passivating layer of insulating material is reformed on the surface of said silicon diaphragm assembly, on which said piezoresistive elements and said conducting paths are constructed, after removing a insulating material layer used as mask means in diffusion method for constructing said piezoresistive elements and said conducting paths.

4. A semiconductor pressure transducer assembly comprising:

a silicon diaphragm assembly having a thin pressure sensitive diaphragm and a thick supporting portion surrounding the pressure sensitive diaphragm portion; piezoresistive elements constructed on the pressure sensitive diaphragm portion of said silicon diaphragm assembly, the resistance values of the piezoresistive elements varying depending on the strain appearing in the diaphragm portion in response to pressure applied thereto; conducting paths constructed on said silicon diaphragm assembly for electrically connecting of said piezoresistive elements; a passivating layer of insulating material covering a surface of said silicon diaphragm assembly on which said piezoresistive elements and said conducting paths are constructed; a layer of conductive material formed on a surface of said passivating layer; and a covering member of insulating material mounted and bonded onto said silicon diaphragm assembly in contact with said conductive material layer on said passivating layer using Anodic Bonding method, wherein said conductive material is formed on the surface of said passivating layer on the thick supporting portion of said silicon diaphragm assembly.

5. A semiconductor pressure transducer assembly as claimed in claim 4, wherein said conductive material is formed on the area of the surface of said passivating layer corresponding to the contacting surface of said covering member.

6. A semiconductor pressure transducer assembly as claimed in claim 1, 3 or 4, wherein in said passivating layer are formed a contacting window, and said layer of conductive material covers said contacting window, therefore, said silicon diaphragm assembly and said conductive material layer electrically connecting to each other.

7. A semiconductor pressure transducer assembly as claimed in claim 1, 3 or 4, wherein said silicon diaphragm assembly has a circular diaphragm portion and said covering member has a circular well.

8. A semiconductor pressure transducer assembly as claimed in claim 1, 3 or 4, wherein said covering member is made of borosilicate glass.

9. A semiconductor pressure transducer assembly as claimed in claim 1, 3 or 4, wherein said passivating layer is silicon dioxide and said conductive material of said conductive layer is polysilicon.

10. A semiconductor pressure transducer assembly as claimed in claim 1, 3 or 4, wherein said piezoresistive elements construct a piezoresistive bridge circuit.

* * * * *